SINGLE TRANSISTOR BINARY TRIGGER

Filed April 28, 1954

INVENTOR
RAYMOND W. EMERY
BY William V. Schelberg
agent 2,724,061

SINGLE TRANSISTOR BINARY TRIGGER

Raymond W. Emery, Poughkeepsie, N. Y., assignor to International Business Machines Corporation, New York, N. Y., a corporation of New York Application April 28, 1954, Serial No. 426,232

11 Claims. (Cl. 307—88.5)

This invention relates to trigger circuits and more particularly to a binary trigger circuit employing a single transistor and having two stable states of operation.

Trigger circuits are known which employ a single current-multiplication transistor and provide bistable operating states. One circuit of this type is described in the patent to A. W. Lo, 2,644,896. This circuit is caused to operate in one of two stable states by alternately applying pulses of opposite polarity to the emitter or base of the transistor used in the circuit, or by applying pulses of the same polarity alternately to the emitter and to the base of the transistor. A second circuit of this type is shown in the patent to J. T. Bangert, 2,595,208. This circuit is caused to revert from one stable state of operation to the other by applying successive pulses of negative polarity to an input terminal commonly connected to the emitter and base of the transistor used in the circuit.

The principal feature of the present invention is the provision of a binary trigger circuit of improved reliability employing a single current multiplication transistor and which is caused to alternately assume one of two stable states of operation by application of successive pulses of positive polarity to a set of input terminals.

An object of this invention is to provide a simplified binary trigger circuit that requires no adjustment when any circuit component including the transistor is replaced by a component that is within standard manufacturing tolerances.

Another object of this invention is to provide an improved binary trigger circuit operating stably on low bias voltages and which is not critical with respect to small changes in power supply voltages.

Another object of this invention is to provide a binary trigger circuit capable of delivering output signals developed across a resistor in the base circuit and/or a resistor in the collector circuit.

A further object of this invention is to provide a binary trigger circuit so constructed as to be unaffected by spurious input disturbances and add shaped pulses.

Other features of the invention will be pointed out in the following description and claims and illustrated in the accompanying drawings, which disclose, by way of example, the principle of the invention and the best mode, which has been contemplated, of applying that principle.

Figure 1:
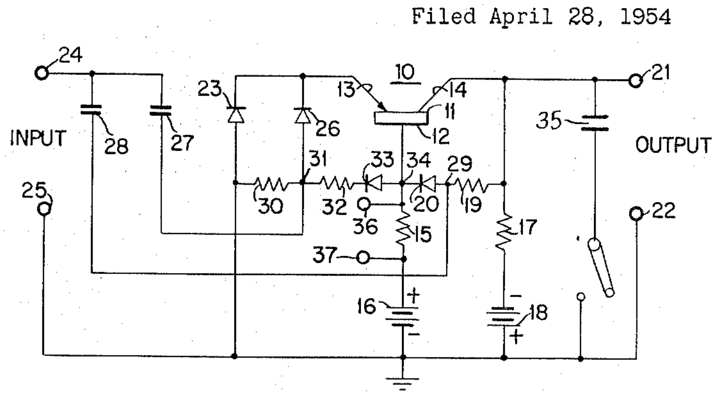
Figure 1 is the basic circuit diagram of a transistor trigger circuit illustrating the invention.

Referring now to Figure 1, a binary trigger circuit is illustrated having a single transistor component labelled element 10. Transistor 10 comprises a body 11, having a base 12, an emitter 13 and a collector 14. A point contact, current-multiplication transistor of the type wherein the emitter and collector electrodes are both in rectifying contact with the semi-conducting body 11, is employed, however, it is contemplated that other known types including special multiple P–N junction transistors may be used. The body 11 consists of a semi-conducting material such as germanium of the "N" type, however, "P" type material may be used with minor circuit polarity changes. The base 12 is in ohmic contact with the body 11 and the emitter 13 and collector 14 are in rectifying contact with the "N" type germanium body 11. The details of manufacture and operation of the various types of transistors are known and need not be described here.

A base resistor 15 is connected between the base 12 and a source of voltage 16, here illustrated as a battery having its negative terminal grounded. A load resistor 17 is connected between the collector 14 and another source of voltage such as a battery 18 having its positive terminal grounded. This polarity configuration of batteries 16 and 18 applies bias in the forward conducting direction to the transistor collector circuit. A circuit comprising a series connected resistor 19 and diode 20, connects the base 12 and collector 14 for a purpose to be later discussed. A pair of output terminals 21 and 22 are provided with terminal 21 connected to the collector 14 and terminal 22 connected to the grounded terminal of the battery 18. Output signals developed across the load resistor 17 appear at the terminals 21 and 22 and are employed for various control purposes as is well known in the art. Auxiliary output signals are also developed across the base resistor 15 and appear at a pair of terminals 36 and 37 which are likewise provided for control purposes.

The emitter 13 is connected to ground through a non-linear resistance device 23 shown as a crystal type rectifier, and is also connected to a terminal 24, comprising one of a pair of input terminals 24 and 25, through a diode 26 and a condenser 27. The terminal 24 is also connected through a capacitor 28 to the junction of the aforementioned elements 19 and 20, which junction is labelled as point 29, while the terminal 25 is grounded. A resistor 30 is connected between the grounded terminal of the diode 23 and the junction of the diode 26 and condenser 27 at a point 31, with a series connected resistor 32 and further diode 33 connected to the point 31 and to the base 12 at a point 34.

Considering the circuit initially to be in a low conduction state, point 31 is held at a potential lower than that of the base 12 because of the voltage drop in the path from the point 34 through the combination of resistors 30 and 32 to ground, with the resistors acting as a voltage divider. The polarity of the non-linear resistance element 26 is such that the emitter 13 is at the same potential as point 31, which is lower than base 12. In this state, point 29 is at the negative potential of collector 14 since it is connected to the collector through resistor 19 and held negative by the bias battery 18. This negative potential does not appear at base 12 because of the blocking effect of the non-linear resistance element 20.

Figures 2, 3:
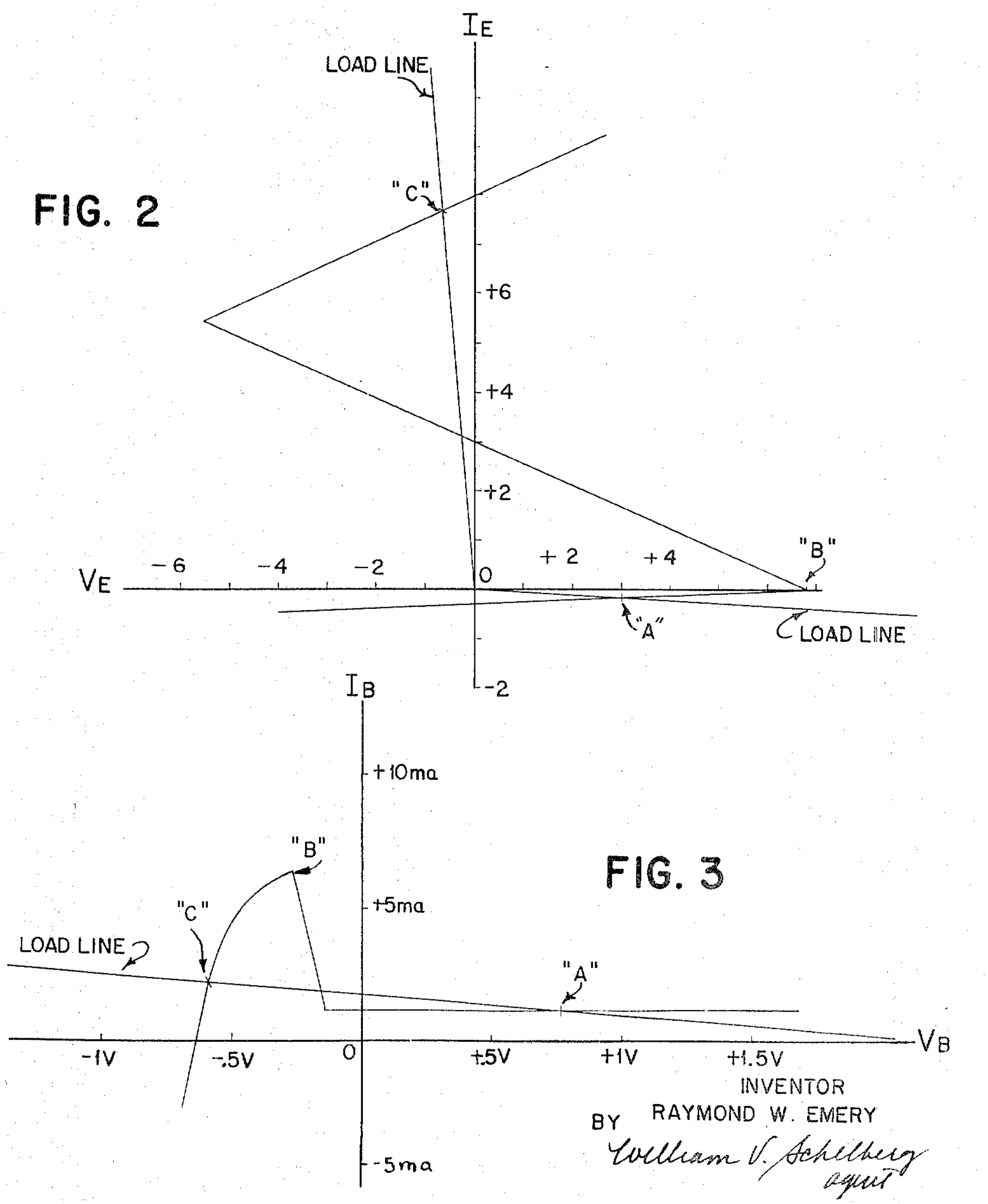
Figure 2 is a graph of the emitter input characteristic for a transistor of the type employed in the circuit illustrated in Figure 1.
Figure 3 is a graphic representation of the base input characteristic of the transistor used in the trigger circuit.

Figures 2 and 3 illustrate representative transistor characteristics with the curve in Figure 2 showing the emitter current $I_E$ plotted versus the emitter voltage $V_E$, while the curve in Figure 3 shows the base current $I_B$ plotted as a function of base voltage $V_B$. The values of emitter and base potential for the low current conduction state described are indicated as a point A on each of these curves. These points are determined by the intersection of a load line with the characteristic, the load line being determined by the value of resistor 15 and the resistance of diode 23.

Conversion from a low conduction state to a high conduction state is accomplished by impressing a positive pulse across the input terminals 24 and 25. This pulse passes through capacitors 27 and 28, which serve pulse shaping and decoupling purposes, and appears at points 29 and 31. At point 29, the pulse has no effect on the base potential because it is blocked by the negative potential at point 29 which potential is the same as the negative potential of collector 14. At point 31, however, the pulse drives the emitter 13 positive. This action is illustrated in Figure 2 with the emitter characteristic traversed from point A, past point B, while the potential of the base 12 remains at point A as shown in Figure 3. The pulse at point 31 is prevented from appearing at base 12 due to the blocking effect of the non-linear resistance element 33. This effectively drives the emitter 13 positive with respect to the base 12 and causes the circuit to assume a high conduction stable state which is indicated graphically at point C in Figures 2 and 3. Point C in Figure 2 indicates the potential of the emitter 13 and in Figure 3 indicates the potential of the base 12, in this alternate state. The potential at point 29, under this condition, is essentially the same as that of the base 12 since the base is now more negative, as indicated in Figure 3, and the bias battery 18 is no longer under nearly open circuit condition. With the trigger circuit operating under the high conduction condition, spurious negative signals appearing at the input terminals and negative parts of valid triggering pulses are prevented from driving the emitter 13 negative with respect to the base 12 and returning the circuit to the low conduction state, by the blocking effect of the non-linear resistance element 26.

As the conductive state of the transistor shifts from the low to the high condition described, current flow through the collector 14, resistor 17 and bias battery 18 increases substantially. An output voltage developed across the resistor 17 is thus caused to appear between the aforementioned output terminals 21 and 22. Current flow through the base resistor 15 is also increased, as may be observed from Figure 3, and an auxiliary output signal developed thereacross appears between terminals 36 and 37. The magnitude of this signal is seen to be the potential difference between points A and C or the displacement along the $V_B$ coordinate in Figure 3.

The circuit is caused to revert from the high conduction state to the low conduction state when a succeeding positive pulse of similar magnitude and shape is impressed across the input terminals 24 and 25. This pulse is similarly applied to the points 29 and 31 after passing through the capacitors 27 and 28. At point 31, the pulse is ineffective due to the path to ground through resistor 30 and the different loading of capacitor 27 from that of capacitor 28. The pulse appears undiminished at point 29, however, and drives the base 12 more positive than the emitter 13. This condition is illustrated in Figure 3 as the input pulse drives the potential of the base 12 past point B, returning the circuit to the low conduction stable state at point A. As may be observed in Figures 2 and 3 from the values of voltage, the base 12 is much more sensitive than the emitter 13 to changes in potential in the high conduction state.

The circuit may be caused to operate successively in the high and low current states in response to correspondingly successively applied positive pulses with the only limitation placed on the circuit being that the transistor have an amplification factor greater than unity and that the positive trigger pulses be of sufficient magnitude to drive emitter 13 past point B shown in Figure 2. Variations in length and shape of succeeding trigger pulses may be corrected by proper selection of values for the pulse shaping and decoupling capacitors 27 and 28 and the circuit operated at frequencies up to 50 KC. Response in excess of this frequency may be obtained by connecting a capacitor across the output terminals 21 and 22. For this purpose, as shown in Figure 1, a capacitor 35 is provided that may be connected across the output terminals by closure of a switch.

While it should be understood that the specifications for the circuit components may vary widely, the following values are included by way of example only, it being understood that the invention is not to be limited to the values indicated:

| | |
|---|---|
| Transistor collector resistance | 15,000 ohms or greater. |
| Base resistor 15 | 4,700 ohms. |
| Coupling resistor 19 | 24,000 ohms. |
| Load resistor 17 | 1,500 ohms. |
| Voltage divider resistor 32 | 12,000 ohms. |
| Voltage divider resistor 30 | 18,000 ohms. |
| Battery 16 | +7 volts. |
| Battery 18 | −15 volts. |
| Capacitors 27 and 28 | 470 micromicrofarads. |
| Capacitor 35 | 330 micromicrofarads. |
| Crystal diodes 20, 23, 26 and 33 | Type IN 56. |

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A binary trigger circuit comprising a single current-multiplication transistor including a base of semi-conducting material, a base electrode making ohmic contact with said base, an emitter electrode making rectifying contact with said base, a collector electrode making rectifying contact with said base; a base resistor having one of its terminals connected to said base electrode; a first D. C. voltage source having its positive terminal connected to the remaining terminal of said base resistor and having its negative terminal connected to a point of common reference potential; a load resistor having one of its terminals connected to said collector electrode; a second D. C. voltage source having its negative terminal connected to the remaining terminal of said load resistor and its positive terminal connected to said point of common reference potential, a connecting resistor having one of its terminals connected to said collector electrode; a first non-linear resistance device having its cathode connected to the remaining terminal of said connecting resistor and having its anode connected to said base electrode; a second non-linear resistance device having its cathode connected to said base electrode; a first voltage divider resistor having one of its terminals connected to the anode of said second non-linear resistance device; a second voltage divider resistor having one of its terminals connected to the remaining terminal of said first voltage divider resistor and having its remaining terminal connected to said point of common reference potential; a third non-linear resistance device having its cathode connected to said point of reference potential and having its anode connected to said emitter electrode; a fourth non-linear resistance device having its cathode connected to the junction of said first and said second voltage divider resistors and having its anode connected to said emitter electrode; a first output terminal connected to said collector electrode; a second output terminal connected to said point of common reference potential; a first decoupling capacitor having one of its terminals connected to said junction of said first and said second voltage divider resistors; a second decoupling capacitor having one of its terminals connected to the junction of said collector resistor and said first non-linear resistance device and its remaining terminal connected to the remaining terminal of said first decoupling capacitor; a first input terminal connected to the junction of said first and said second decoupling capacitors and a second input terminal connected to said common reference potential.

2. The combination in claim 1 including a frequency response capacitor having one of its terminals connected to said collector electrode and the remaining terminal connected to said point of common reference potential.

3. A binary trigger circuit having two stable states of operation comprising a single current-multiplication transistor including a base of semi-conducting material, an emitter electrode making rectifying contacts with said base, a collector electrode making rectifying contact with said base and a base electrode making ohmic contact with said base; a base resistor having one of its terminals connected to said base electrode; a first D. C. voltage source having its positive terminal connected to the remaining terminal of said base resistor and having its negative terminal connected to a point of common reference potential; a load resistor having one of its terminals connected to said collector electrode; a second D. C. voltage source having its negative terminal connected to the remaining terminal of said load resistor and its positive terminal connected to said point of common reference potential; a first non-linear resistance device having its cathode connected to said common reference potential and its anode connected to said emitter electrode; a second non-linear resistance device having its cathode connected to said base electrode; a first voltage divider resistor having one terminal connected to the anode of said second non-linear resistance device; a second voltage divider resistor having one of its terminals connected to the remaining terminal of said first voltage divider resistor and its remaining terminal connected to said common reference potential; a third non-linear resistance device having its cathode connected to the junction of said first and said second voltage divider resistors and its anode connected to said emitter electrode; a first output terminal connected to said collector electrode; a second output terminal connected to said common reference potential; a pair of input terminals, means connecting one of said input terminals to said point of common reference potential, and circuit means connecting the other of said input terminals to said emitter electrode and to said base electrode so that successive positive pulses applied to said pair of input terminals causes said binary trigger circuit alternately to assume one of said two stable states of operation.

4. The combination of claim 3 wherein said circuit means includes additional means for blocking said positive pulses alternately at said base and at said emitter by potentials developed therein dependent upon the stable state of said binary trigger circuit.

5. The combination of claim 3 including a frequency response capacitor having one terminal connected to said first output terminal and having its remaining terminal connected to said second output terminal.

6. A binary trigger circuit of the type using a single transistor and which is converted alternately from one stable state to another stable state by application of successive positive input pulses, comprising a single transistor having a signal input electrode, a signal output electrode and a base electrode; a first D. C. bias voltage source; means connecting said D. C. bias voltage source to said output electrode so as to provide bias in the forward conduction direction with respect to a point of common reference potential; a second D. C. bias voltage source; means connecting said second D. C. bias voltage source to said base electrode and to said input electrode so that said base electrode is at a potential higher than said point of common reference potential and said input electrode is at a potential lower than that of said base electrode but higher than said point of common reference potential; a first output terminal connected to said output electrode, a second output terminal connected to said point of common reference potential, a pair of input terminals, means connecting one of said input terminals to said point of common reference potential and the other of said input terminals to said input electrode and to said base electrode, and means connecting said output electrode to said means connecting said other of said input terminals to said base electrode whereby an input pulse is or is not blocked from said base electrode depending on the stable state of said trigger circuit.

7. A bistable trigger circuit comprising a current multiplication transistor having a body of semi-conducting material, base, collector and emitter electrodes in contact with said body, a load impedance, a first source of bias voltage connected to a point of reference potential and to said collector electrode through said load impedance, a base resistor, a second source of bias voltage connected to said point of reference potential and to said base electrode through said base resistor, a diode connected between said point of reference potential and said emitter electrode, circuit means including a series connected resistor and another diode coupling said collector and base electrodes, circuit means including a voltage divider and still another diode connected in series between said base and said point of reference potential, means connecting an intermediate point of said voltage divider with said emitter electrode, an input terminal connected to the junction of said series connected resistor and diode through a first capacitor and connected to said voltage divider through a second capacitor, and an output terminal connected to said collector electrode.

8. A bistable trigger circuit comprising a current multiplication transistor having a body of semi-conducting material, base, collector and emitter electrodes in contact with said body, a load impedance, a first source of bias voltage connected to a point of reference potential and to said collector electrode through said load impedance, a base resistor, a second source of bias voltage connected to said point of reference potential and to said base electrode through said base resistor, a diode connected between said point of reference potential and said emitter electrode, circuit means including a series connected resistor and another diode coupling said collector and base electrode, circuit means including a voltage divider connected between said base and said point of reference potential, a further diode connected to said voltage divider and to said emitter electrode, an input terminal connected to the junction of said series connected resistor and diode through a first capacitor and to the junction of said further diode and voltage divider through a second capacitor, and an output terminal connected to said collector electrode.

9. A bistable trigger circuit comprising a current multiplication transistor having a body of semi-conducting material, base, collector and emitter electrodes in contact with said body, a load impedance, a first source of bias voltage connected to a point of reference potential and to said collector electrode through said load impedance, a base resistor, a second source of bias voltage connected to said point of reference potential and to said base electrode through said base resistor, a diode connected between said point of reference potential and said emitter electrode, circuit means including a series connected resistor and another diode coupling said collector and base electrodes, circuit means including a voltage divider connected in series between said base and said point of reference potential, means connecting an intermediate point on said voltage divider to said emitter electrode, an input terminal connected to the junction of said series connected resistor and diode through a first capacitor and connected to said voltage divider through a second capacitor, and an output terminal connected to said collector electrode.

10. A bistable trigger circuit comprising a current multiplication transistor having a body of semi-conducting material, base, collector and emitter electrodes in contact with said body, a load impedance, a first source of bias voltage connected to a point of reference potential and to said collector electrode through said load impedance, a base resistor, a second source of bias voltage connected to said point of reference potential and to said base electrode through said base resistor, a diode connected between said point of reference potential and said emitter electrode, circuit means including a series connected resistor and another diode coupling said collector and base electrodes, circuit means including a voltage divider connected in series between said base and said point of reference potential, means connecting an intermediate point on said voltage divider to said emitter electrode, an input terminal connected to the junction of said series connected resistor and diode through a first capacitor and connected to said voltage divider through a second capacitor, and an output signal terminal coupled to said base electrode.

11. A bistable trigger circuit comprising a current multiplication transistor having a body of semi-conducting material, base, collector and emitter electrodes in contact with said body, a load impedance, a first source of bias voltage connected to a point of reference potential and to said collector electrode through said load impedance, a base resistor, a second source of bias voltage connected to said point of reference potential and to said base electrode through said base resistor, a diode connected between said point of reference potential and said emitter electrode, circuit means including a series connected resistor and another diode coupling said collector and base electrode, circuit means including a voltage divider connected in series between said base and said point of reference potential, means connecting an intermediate point on said voltage divider to said emitter electrode, an input terminal connected to the junction of said series connected resistor and diode through a first capacitor and connected to said voltage divider through a second capacitor, an output terminal coupled to said collector electrode, and an auxiliary output terminal coupled to said base electrode.

References Cited in the file of this patent

UNITED STATES PATENTS

| | | |
|---|---|---|
| 2,595,208 | Bangert | Apr. 29, 1952 |
| 2,644,896 | Lo | July 7, 1953 |
| 2,670,445 | Felker | Feb. 23, 1954 |